US008537380B2

(12) United States Patent
Yamada

(10) Patent No.: US 8,537,380 B2
(45) Date of Patent: Sep. 17, 2013

(54) IMAGE FORMING APPARATUS AND IMAGE FORMING SYSTEM

(75) Inventor: Akihiro Yamada, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 993 days.

(21) Appl. No.: 12/608,530

(22) Filed: Oct. 29, 2009

(65) Prior Publication Data

US 2010/0110459 A1 May 6, 2010

(30) Foreign Application Priority Data

Oct. 30, 2008 (JP) ................................ 2008-279789

(51) Int. Cl.
*G06K 15/00* (2006.01)

(52) U.S. Cl.
USPC ......... 358/1.14; 358/1.9; 358/1.13; 358/1.15; 358/1.16; 358/1.18; 358/518; 726/4; 726/5; 726/6; 726/7; 726/14; 726/18; 726/19; 726/26; 726/27; 726/28

(58) Field of Classification Search
None
See application file for complete search history.

(56) References Cited

U.S. PATENT DOCUMENTS

| 6,353,716 B1* | 3/2002 | Uehara et al. ................... 399/44 |
| 2004/0105689 A1 | 6/2004 | Shimura et al. |
| 2004/0160620 A1* | 8/2004 | Ikegami et al. ............... 358/1.13 |
| 2005/0117926 A1* | 6/2005 | Tanaka et al. ................... 399/49 |
| 2006/0136992 A1 | 6/2006 | Shigeeda |
| 2006/0161547 A1* | 7/2006 | Ohtani ............................. 707/9 |
| 2006/0203309 A1 | 9/2006 | Hirayama |
| 2007/0206205 A1 | 9/2007 | Suzuki |
| 2008/0127307 A1 | 5/2008 | Fukuta |
| 2009/0097064 A1* | 4/2009 | Tominaga ................... 358/1.15 |
| 2009/0141298 A1* | 6/2009 | Kushida ....................... 358/1.12 |
| 2009/0304399 A1* | 12/2009 | Morikuni ...................... 399/27 |

FOREIGN PATENT DOCUMENTS

| JP | 2003-233279 | 8/2003 |
| JP | 2005-10583 | 1/2005 |
| JP | 2005-10584 | 1/2005 |
| JP | 2005-119010 | 5/2005 |
| JP | 2006-130779 | 5/2006 |
| JP | 2006-138916 | 6/2006 |
| JP | 2006-235009 | 9/2006 |
| JP | 2007-164640 | 6/2007 |
| JP | 2008-32960 | 2/2008 |

* cited by examiner

*Primary Examiner* — Miya J Cato
(74) *Attorney, Agent, or Firm* — Scully, Scott, Murphy & Presser, P.C.

(57) ABSTRACT

An image forming apparatus includes: a forming unit that includes an image forming function for forming an image; a restricting unit that restricts usage of the image forming function based on presence or absence of usage authorization for the image forming function of the forming unit; an adjusting unit that executes an image quality adjusting process to improve a quality of the image formed by the forming unit; and a control unit that inhibits the adjusting unit from executing the image quality adjusting process in accordance with presence or absence of restriction of the usage of the image forming function by the restricting unit.

10 Claims, 7 Drawing Sheets

IMAGE FORMING APPARATUS AND IMAGE FORMING SYSTEM

CROSS-REFERENCE TO RELATED APPLICATIONS

This application claims priority from Japanese Patent Application No. 2008-279789 filed on Oct. 30, 2008, the entire subject matter of which is incorporated herein by reference.

TECHNICAL FIELD

The invention relates to an image forming apparatus and an image forming system, and in particular to an image forming apparatus and an image forming system including a function for restricting usage of an image forming function.

BACKGROUND

As an image forming apparatus including a function for restricting usage of various types of functions of copying, PC printing, scanning, facsimile transmission and receiving, etc, there has been proposed a known image forming apparatus that authenticates a user and restricts usage of a part of functions or the number of times of usage of the functions in accordance with usage restriction information of each user.

The known image forming apparatus also includes a function for carrying out an image quality adjusting process (so-called "calibration," etc.), which measures deviation in respective colors of image formed positions and deviation in density of the respective formed colors and corrects the deviations. The image quality adjusting process is triggered by a printing request from a user and is executed if predetermined conditions are satisfied, for example, if a number of printed sheets after the last image quality adjusting process exceeds the predetermined number.

SUMMARY

In the known image forming apparatus, even if for a user who does not have any usage authorization of color printing function, the image quality adjusting process such as execution of measurement for positional deviations of respective colors is frequently carried out. Thus, due to such a less necessity image quality adjusting process, ink or toner may be wasted, and waiting time of a user may be increased.

Therefore, illustrative aspects of the invention provide an image forming apparatus and an image forming system capable of inhibiting execution of an image quality adjusting process.

According to one illustrative aspect of the invention, there is provided an image forming apparatus comprising: a forming unit that includes an image forming function for forming an image; a restricting unit that restricts usage of the image forming function based on presence or absence of usage authorization for the image forming function of the forming unit; an adjusting unit that executes an image quality adjusting process to improve a quality of the image formed by the forming unit; and a control unit that inhibits the adjusting unit from executing the image quality adjusting process in accordance with presence or absence of restriction of the usage of the image forming function by the restricting unit.

According thereto, execution of an image quality adjusting process is inhibited in accordance with presence or absence of usage authorization for the image forming function. For example, by inhibiting execution of an image quality adjusting process such as positional deviation correction and density correction in a state where usage of the color printing function is restricted, it is possible to inhibit execution of the image quality adjusting process having less necessity. Therefore, the ink or toner can be saved, and the waiting time can be reduced.

According to another illustrative aspect of the invention, there is provided a image forming system comprising: an image forming apparatus; and a higher-level device that communicates with the image forming apparatus, wherein the image forming apparatus comprises: a forming unit that forms an image; and an adjusting unit that executes an image quality adjusting process to improve a quality of the image formed by the forming unit, wherein the higher-level device comprises: an instructing unit that instructs the image forming apparatus to form the image, and wherein one of the image forming apparatus and the higher-level device further comprises: a restricting unit that restricts usage of the image forming function based on presence or absence of usage authorization for the image forming function of the forming unit; and a control unit that inhibits the adjusting unit from executing the image quality adjusting process in accordance with presence or absence of restriction of the usage of the image forming function by the restricting unit.

According thereto, execution of the image quality adjusting process is inhibited in accordance with presence or absence of usage authorization for the image forming function. For example, by inhibiting execution of the image quality adjusting process such as positional deviation correction and density correction in a state where usage of the color printing function is restricted, it is possible to inhibit execution of the image quality adjusting process having less necessity. Therefore, the ink or toner can be saved, and the waiting time can be reduced.

According to the illustrative aspects of the invention, execution of an image quality adjusting process is inhibited in accordance with presence or absence of usage authorization for the image forming function. For example, by inhibiting execution of the image quality adjusting process such as positional deviation correction and density correction in a state where usage of the color printing function is restricted, it is possible to inhibit execution of the image quality adjusting process having less necessity. Therefore, the ink and toner can be saved, and the waiting time can be reduced.

DETAILED DESCRIPTION OF THE PREFERRED EMBODIMENTS

Exemplary embodiments of the invention will now be described with reference to the drawings.

First Exemplary Embodiment

Figure 1:
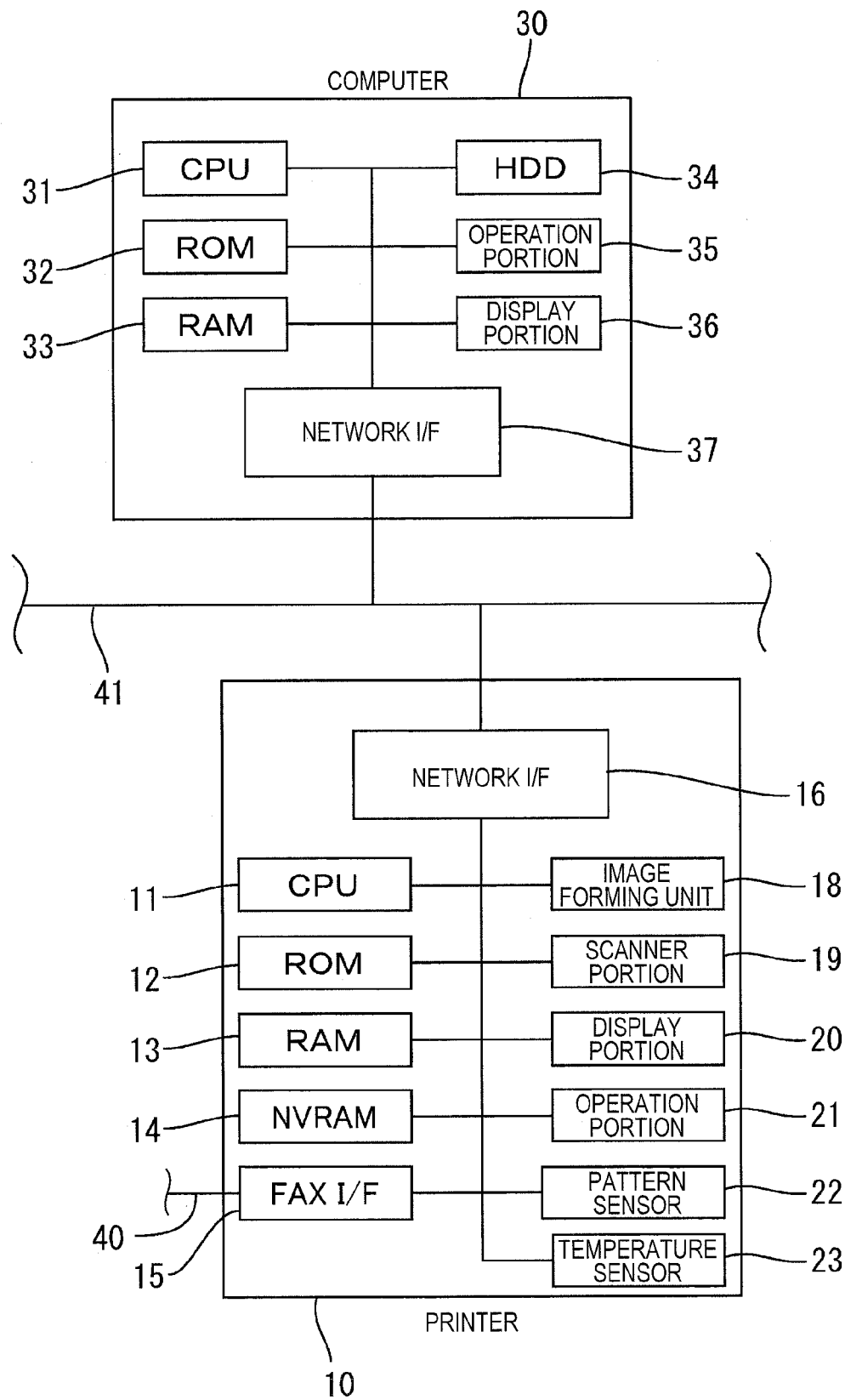
FIG. 1 is a block diagram of an image forming apparatus and a computer according to a first exemplary embodiment of the invention.
Figure 2:
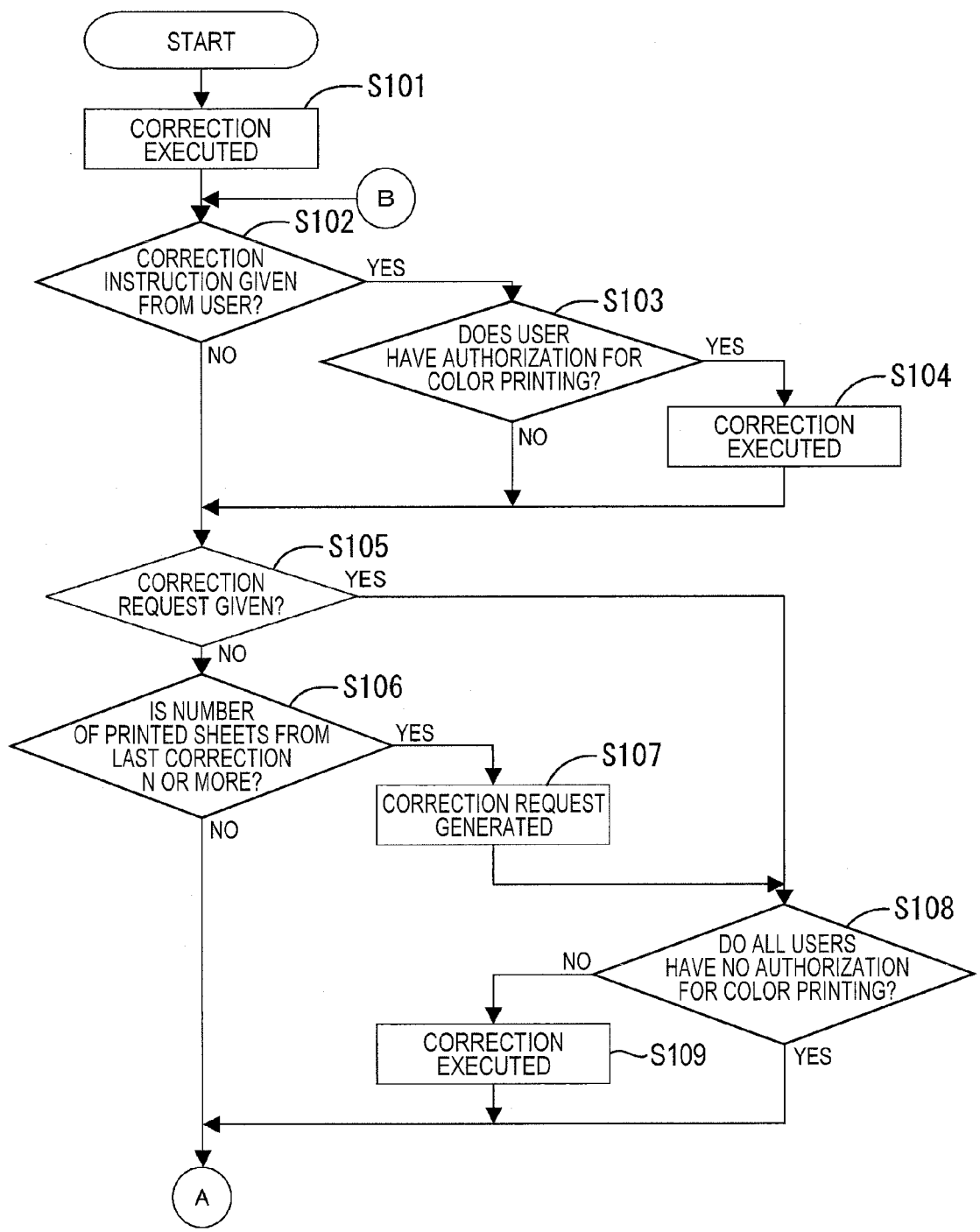
FIG. 2 is a flowchart showing flows of a printing correction control process according to the first exemplary embodiment.
Figure 3:
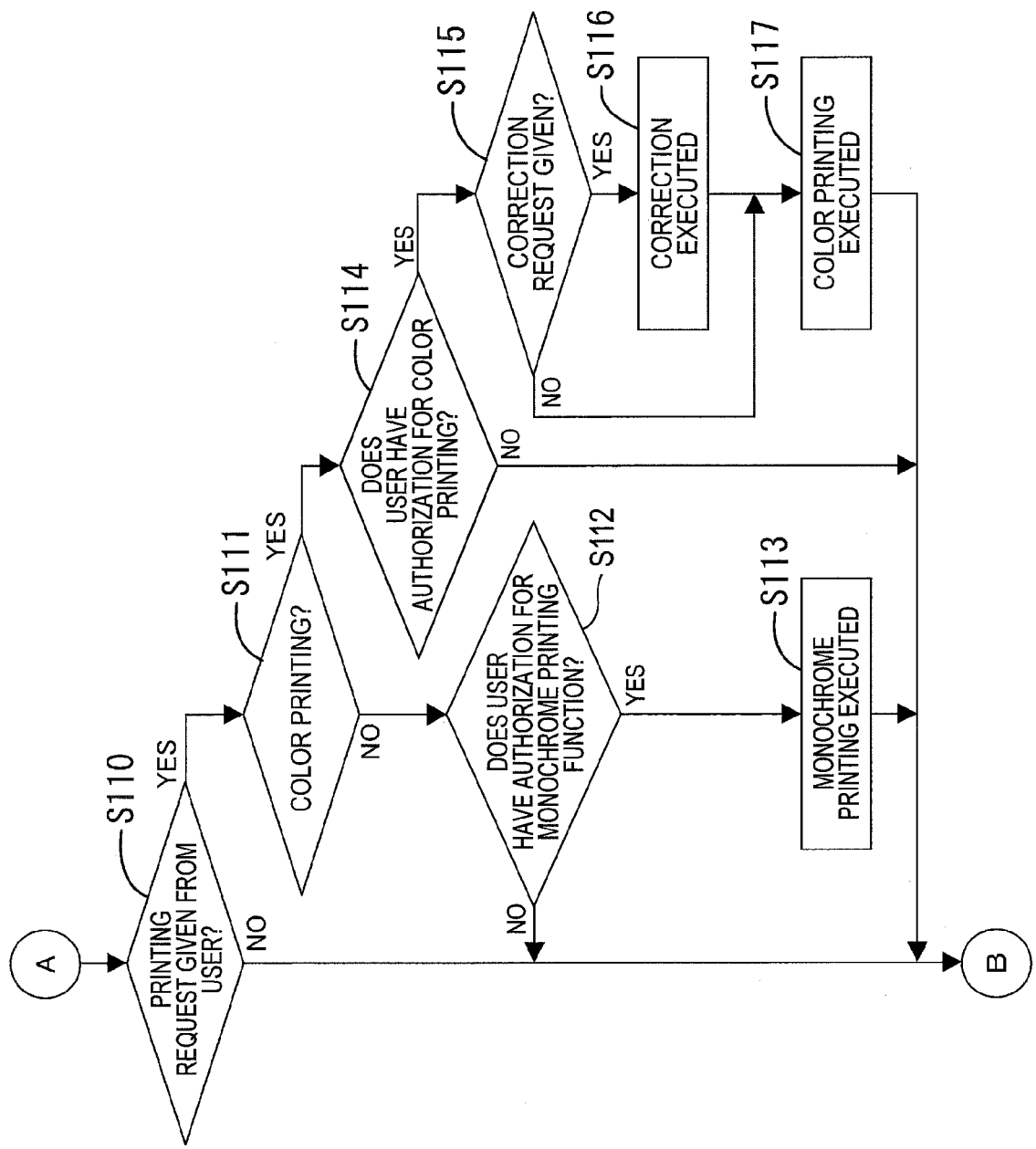
FIG. 3 is another flowchart showing flows of the printing correction control process continued from FIG. 2.

Referring to FIGS. 1 to 3, first exemplary embodiment of the invention will be described.

(Image Forming Apparatus and Computer)

FIG. 1 is a block diagram showing a brief configuration of an image forming apparatus 10 and a computer 30 connected to the image forming apparatus 10. Incidentally, a printer is one example of the image forming apparatus 10.

The image forming apparatus 10 is, for example, a multi-function device equipped with copying, printing, scanning, and facsimile functions. As shown in FIG. 1, the image forming apparatus 10 includes a CPU 11, a ROM 12, a RAM 13, a NVRAM (non-volatile memory) 14, a facsimile interface 15, a network interface 16, an image forming unit 18, a scanner portion 19, a display portion 20, an operation portion 21, a pattern sensor 22, a temperature sensor 23, etc.

Programs to execute various types of actions of the image forming apparatus 10, such as a printing correction control process described later, are stored in the ROM 12, and the CPU 11 (one example of a restricting unit, adjusting unit, controlling unit and generating unit) controls respective parts while storing the processing results in the RAM 13 or the NVRAM 14 in accordance with the programs read from the ROM 12. The facsimile interface 15 (one example of a facsimile receiving unit) is connected to a telephone line 40, and is capable of transmitting facsimile data to and receiving the same from peripheral facsimile apparatuses. The network interface 16 (one example of an accepting unit and acquiring unit) is connected to a peripheral computer 30, etc., via a communications line 41. Therefore, mutual data communications are enabled.

The image forming unit 18 (one example of a forming unit) forms an image on a sheet (one example of a medium to be recorded) using multiple colors of colorants (ink and toner). The scanner portion 19 (one example of an acquiring unit) acquires image data by reading a document. The display portion 20 is provided with a display and lamps, etc., and is capable of displaying various types of setting screens and action states of the apparatus. The operation portion 21 (one example of an accepting unit) is provided with a plurality of buttons, and is capable of carrying out various types of input operations by a user. The pattern sensor 22 detects patterns formed by the image forming unit 18 when executing a correction process described later. The temperature sensor 23 detects the ambient temperature and outputs the detection signal.

The computer 30 (one example of a higher-level device) is provided with an operation portion 35 consisting of a CPU 31 (one example of an instructing unit), a ROM 32, a RAM 33, a hard-disk drive 34, a keyboard and a pointing device, a display portion 36 composed of a liquid crystal display, and a network interface 37 connected to a communications line 41, etc. Application software to create image data for printing and various types of programs such as a printer driver to control the image forming apparatus 10 are stored in the hard-disk drive 34.

(Usage Restriction Function)

The CPU 11 of the image forming apparatus 10 has a function for restricting usage of various types of functions based on usage restriction information stored in the NVRAM 14. The usage restriction information includes conditions to determine presence or absence of usage authorization for various types of functions or conditions to set the presence or absence of the usage authorization for various types of functions. In the first exemplary embodiment, as for the usage restriction information, a number of printable sheets and available usage time is permitted are set for each user with respect to each of color printing function and monochrome printing function (both are functions used for copying, printing, facsimile data printing).

That is, it is determined that users registered in the usage restriction information have the usage authorization within a set number of printable sheets and in the available usage time when using respective printing functions, and in all other cases, it is determined that users do not have any usage authorization. The CPU 11 stores each of the number of sheets for color printing and the number of sheets for monochrome printing in the NVRAM 14 for each user when executing a printing function, and determines whether within the number of printable sheets, with reference to the above-described information. In addition, the number of printable sheets and the available usage time may be set without any limitation in the usage restriction information.

The usage restriction information may be set by, for example, an administrator causing the CPU 11 of the image forming apparatus 10 to execute setting programs and inputting the setting information through the operation portion 21 of the image forming apparatus 10. Alternatively, the CPU 11 of the image forming apparatus 10 may take in the usage restriction information created by an administrator in a peripheral computer 30, etc., via the network interface 16. Further, the image forming apparatus 10 may not have any usage restriction information therein. In this case, the image forming apparatus 10 makes an inquiry to a peripheral server computer, etc., which holds the usage restriction information, when determining whether the usage authorization is present or absent.

(Printing Correction Control Process)

Referring to FIGS. 2 and 3, actions of the printing correction control process for controlling a printing action and a correction action in the image forming apparatus 10 will be described.

When the power of the image forming apparatus 10 is turned on, the CPU 11 starts execution of the printing correction control process, and as shown in FIG. 2, first executes a correction process (S101). Incidentally, an image quality adjusting process to improve the image quality when forming an image, such as density correction and positional deviation correction, may be called a "correction process."

In the density correction, the densities of respective colors of density patterns, which are formed on a carrier such as a belt and a drum by the image forming unit 18, are measured by the pattern sensor 22, and the densities in forming respective colors of images are adjusted so as to become appropriate based on the results. In addition, in the positional deviation correction, respective colors of patterns are formed on the carrier by the image forming unit 18, and the patterns are detected by the pattern sensor 22. Therefore, deviations of respective colors in the image formed positions are measured, and the image formed positions of respective colors are adjusted so as to become appropriate based on the results.

Subsequently, the CPU 11 determines whether a correction instruction is accepted from a user (S102). Herein, for example, the CPU 11 determines whether a correction instruction transmitted from the computer 30 to the image forming apparatus 10 by a user is received via the network interface 16. If the correction instruction is accepted (S102:

Yes), it is determined with reference to the above-described usage restriction information whether the user having the user name (the log-in name of the computer 30) included in the correction instruction has usage authorization for the color printing function (S103). Incidentally, the correction instruction may be input from the operation portion 21 of the image forming apparatus 10 by a user. In this case, for example, the user may be authenticated by causing a user to input the user name and password through the operation portion 21.

The CPU 11 executes a correction process (S104) if the user having given the correction instruction has the usage authorization for the color printing function (S103: Yes). In addition, if no correction instruction is accepted (S102: No) or if the user having given the correction instruction does not have any usage authorization for the color printing function (S103: No), the correction process is not executed.

Next, the CPU 11 determines whether a correction request is given (S105). The correction request is generated by the CPU 11 itself as described below. If no correction request is given (S105: No), it is determined whether the number of printed sheets from execution of the last correction process exceeds a predetermined number of sheets N (one example of predetermined values) or more (S106). Further, the CPU 11 stores the number of printed sheets when the latest correction process is executed, in the NVRAM 14, and determines the same based on the information.

Then, if the number of printed sheets from execution of the last correction process is the predetermined number of sheets N or more (S106: Yes), a correction request is generated (S107). Herein, for example, the flag value showing a correction request, which is stored in the RAM 13, etc., is turned on. The CPU 11 determines (S108) that all the users registered in the usage restriction information do not have any usage authorization for the color printing function if a correction request is generated in S107 or if a correction request is given (turned on) in S105 (S105: Yes).

If only a single user having usage authorization for the color printing function exists (S108: No), that is, in a state where there is a possibility for the color printing function to be utilized, a correction process is executed (S109). In addition, the correction request is deleted by executing the correction process. Further, if any user having usage authorization for the color printing function does not exist (S108: Yes), that is, in a state where there is no possibility for the color printing function to be utilized, no correction process is executed.

Next, the CPU 11 determines whether a printing request is accepted from a user as shown in FIG. 3 (S110). The printing request may be transmitted from a peripheral computer 30 by a user and is received via the network interface 16, or may be input from the operation portion 21 of the image forming apparatus 10 by a copy instruction, etc. If no printing request is accepted (S110: No), the process returns to S102 in FIG. 2, and the processes similar to the above are repeated.

If a printing request is accepted (S110: Yes), it is determined whether the printing request is a request for color printing (S111). If the printing request is a request for monochrome printing (S111: No), it is determined whether a user who input the printing request has usage authorization for monochrome printing function (S112). If the user does not have any usage authorization for the monochrome printing function (S112: No), no printing is executed, and the process advances to S102. If the user has usage authorization for the monochrome printing function (S112: Yes), monochrome printing is executed in accordance with the printing request (S113).

In S111, if the printing request is a request for color printing (S111: Yes), it is determined whether the user who input the printing request has usage authorization for the color printing function (S114). If the user does not have the usage authorization for the color printing function (S114: No), no printing is executed, and the process advances to S102. If the user has the usage authorization for the color printing function (S114: Yes), it is determined whether a correction request is given (S115).

Here, a case where a correction request is given means a case where a state where any correction process has not been executed since all the users do not have usage authorization for the color printing function in S108 after the correction request is generated in S107 is changed to a state where a user who input a printing request has the usage authorization for the color printing function. Thus, for example, when the usage time by the user is entered into the usage available time from outside the available usage time in line with elapse of time, or when an administrator has changed the setting of the usage authorization of a user, the usage authorization for the user is changed from the absent to present. If the counter of a user whose number of printable sheets has reached the upper limit is reset when the CPU 11 resets the number of printed sheets permitted to respective users at the moment when reaching the specified time, the usage authorization is changed from absent to present.

Continuously, the CPU 11 executes a correction process (S116) when a correction request is given (S115: Yes), and thereafter executes color printing based on the printing request (S117). In addition, the correction request is deleted by executing the correction process. Further, if no correction request is given (S115: No), color printing is executed in S117 without executing the correction process. After that, the CPU 11 returns to S102 and repeats processes similar to the above.

As described above, according to the first exemplary embodiment, execution of a correction process (image quality adjusting process) is inhibited in accordance with presence or absence of usage authorization for the printing function (image forming function). For example, by restricting execution of a correction process such as positional deviation correction and density correction in a state where no usage authorization for color printing function is given, it becomes possible to inhibit execution of a correction process having less necessity. Therefore, it is possible to save the ink or toner, and to reduce the waiting time.

In addition, by inhibiting execution of the correction process for an execution instruction of a correction process from a user not having any usage authorization for color printing function, execution of the correction process having less necessity can be inhibited.

Further, if there does not exist any user having usage authorization for the color printing function when an execution request of the correction process is generated, execution of the correction process is not permitted. Therefore, it is possible to inhibit execution of the correction process having less necessity.

The usage authorization is determined for presence or absence based on whether or not the number of printed sheets (usage amount) of the printing function and the usage time satisfy predetermined conditions. Therefore, it becomes easy to manage the usage authorization, and the usability can be improved.

Further, since the image quality is apt to be influenced if the change amount in the number of printed sheets (usage amount) from the last correction process is large, the image quality is secured by carrying out the correction process. Further, since it is considered that influence on image quality is comparatively small if the change amount in the usage amount, etc., from the last correction process is small, it is possible to inhibit execution of the correction process having less necessity by not executing the correction process.

In addition, if the color printing function cannot be utilized, execution of the correction process having less necessity can be inhibited by inhibiting the execution thereof.

Second Exemplary Embodiment

Figure 4:
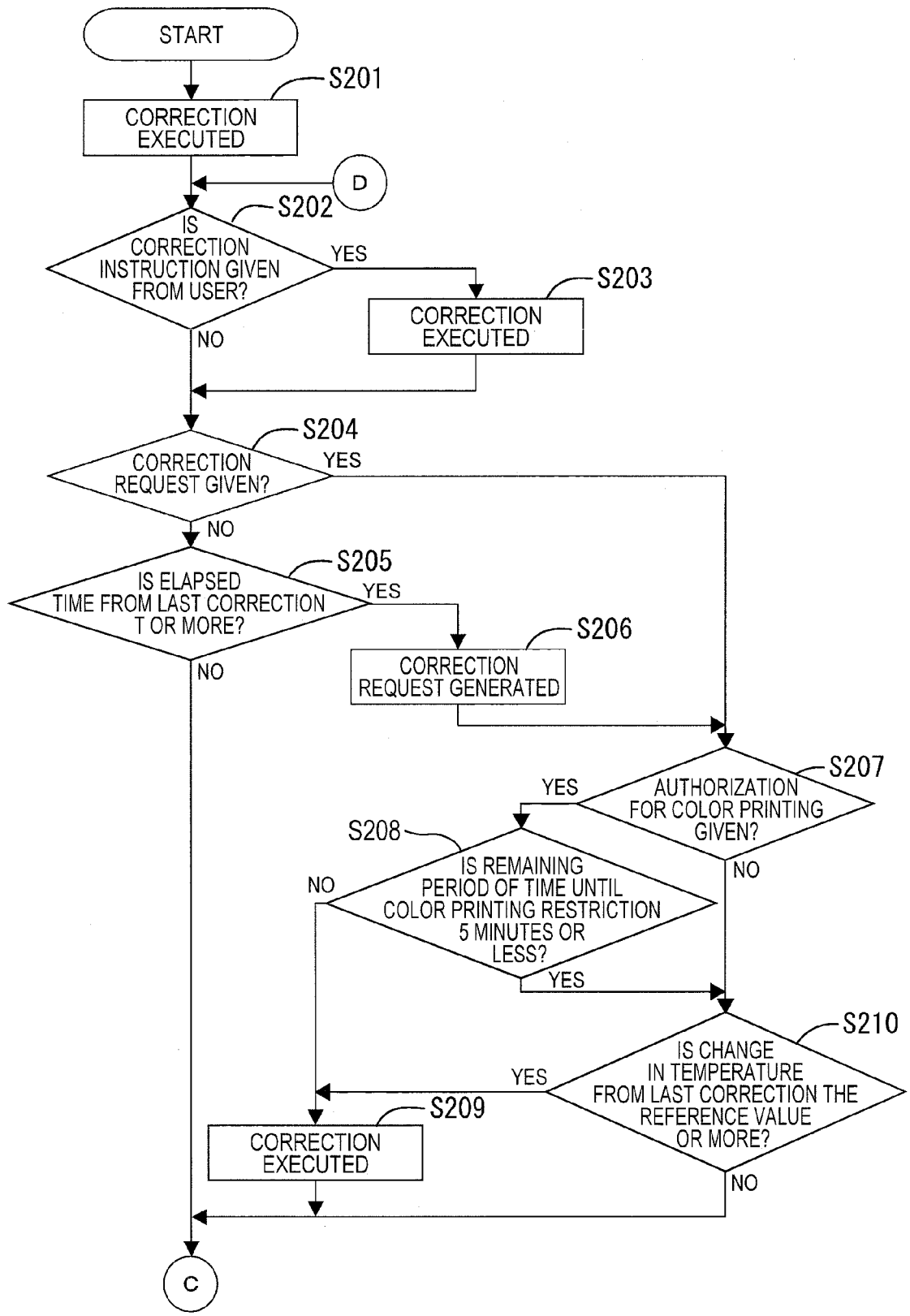
FIG. 4 is a flowchart showing flows of a printing correction control process according to a second exemplary embodiment of the invention.
Figure 5:
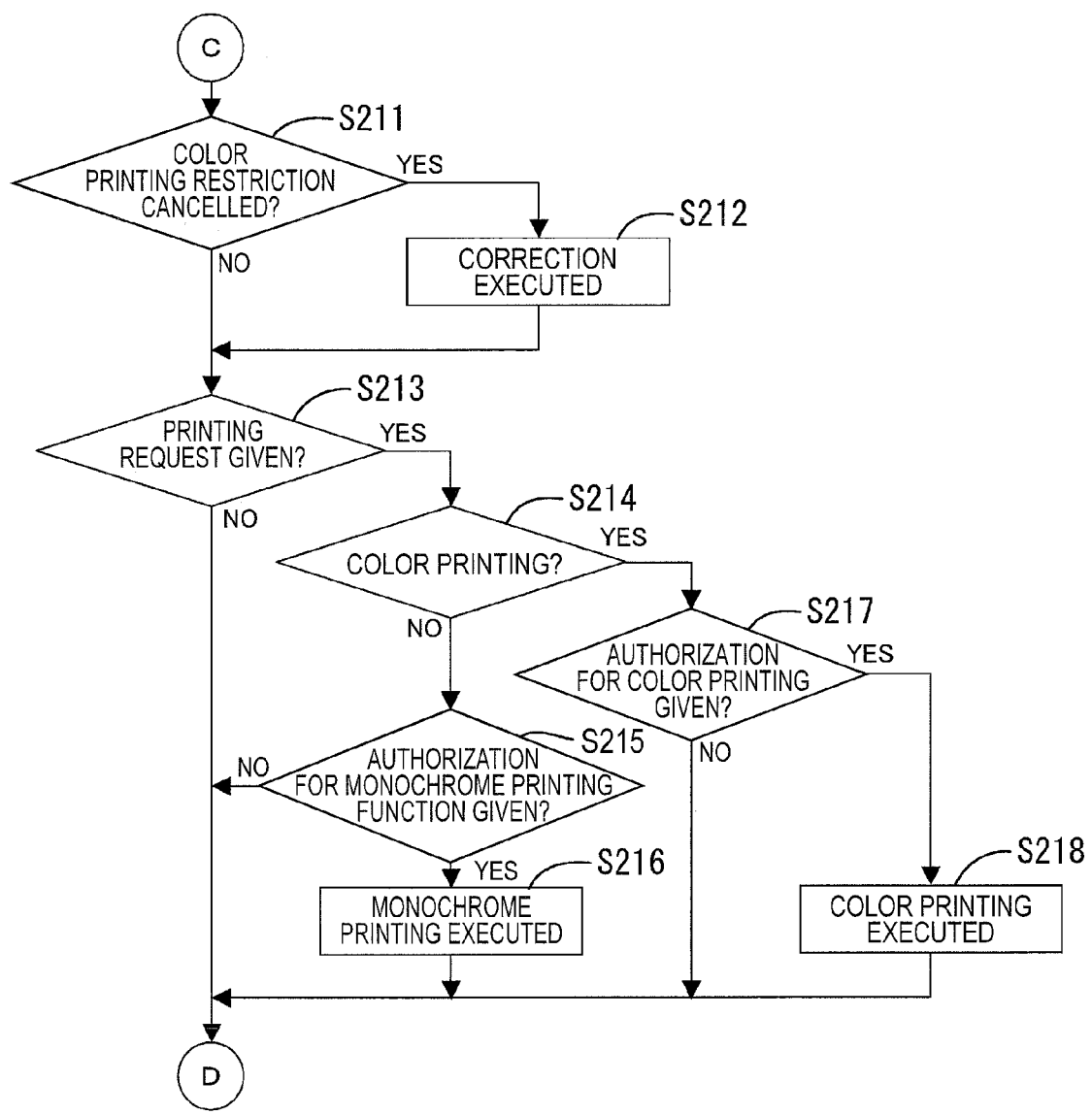
FIG. 5 is another flowchart showing flows of the printing correction control process continued from FIG. 4.

Referring to FIGS. 4 and 5, a second exemplary embodiment according to the invention will be described.

The entire configuration of the image forming apparatus 10 according to the second exemplary embodiment is similar to that of the first exemplary embodiment, but conditions for executing a correction process in the printing correction control process are changed from the first exemplary embodiment. Incidentally, in the first exemplary embodiment, different usage authorization is set for each user with respect to the usage restriction information. However, in the second exemplary embodiment, only a single type of usage authorization is set for each of the color printing function and the monochrome printing function, that is, common usage authorization is set for all of the users of the image forming apparatus 10.

When the printing correction control process is started after the power of the image forming apparatus 10 is turned on, the CPU 11 first executes a correction process as shown in FIG. 4 (S201). Then, it is determined whether a correction instruction is accepted from a user (S202). If the correction instruction is accepted (S202: Yes), the correction process is executed (S203). That is, in the second exemplary embodiment, if a correction instruction is accepted from a user, the correction process is executed regardless of presence or absence of the usage authorization.

Next, the CPU 11 determines whether a correction request is given (S204). If no correction request is given, (S204: No), it is determined whether the elapsed time from execution of the last correction process is the predetermined period of time T (one example of predetermined values) or more (S205). When the elapsed time is the predetermined period of time T or more (S205: Yes), a correction request is generated (S206). If the correction request is generated in S206, or if the correction request is given in S204 (S204: Yes), it is then determined whether usage authorization is given for color printing function (S207).

If usage authorization for the color printing function is given (S207: Yes), it is determined whether the remaining period of time until termination of the available usage time, that is, the remaining period of time until the usage authorization for the color printing function turns from present to absent (one example of available usage time and available usage amount) is 5 minutes or less (S208). If the remaining period of time until termination of the available usage time is greater than 5 minutes (S208: No), a correction process is executed (S209).

If no usage authorization for the color printing function is given (S207: No) or if the remaining period of time until termination of the available usage time for the color printing is 5 minutes or less (S208: Yes), it is further determined whether the change amount in temperature from the last correction execution is a predetermined reference value or more (S210). Incidentally, the CPU 11 stores the value, which has been measured by the temperature sensor 23 when executing the correction, in the NVRAM 14, and carries out the above determination by comparing the value with the value presently measured by the temperature sensor 23.

If the change amount in temperature from the last correction execution is the reference value or more (S210: Yes), the process advances to S209 and executes a correction process. If the change amount in temperature is less than the reference value (S210: No), no correction process is executed. Thus, if it is considered that influences which a change in temperature exerts on image quality are comparatively large, the image quality can be secured by executing a correction process even if no usage authorization for the color printing function is given. If it is considered that the above-described influences are not so large, the process such as S210 may be appropriately omitted.

Next, as shown in FIG. 5, the CPU 11 determines whether the color printing restriction is cancelled, that is, whether the usage authorization for the color printing function is changed from absent to present after executing of the last correction process (S211). If the color printing restriction is cancelled, that is, if the usage authorization for the color printing function is changed from absent to present (S211: Yes), the correction process is executed (S212). Therefore, in this case, even in a state where any correction instruction is accepted from a user, and if no correction request is generated, the correction process is carried out. Further, if the color printing restriction is not executed (S211: No), the correction process is not carried out.

Next, the CPU 11 determines whether a printing request is accepted (S213). If the printing request is accepted (S213: Yes), monochrome printing is executed (S216) if the usage authorization for the monochrome printing function is given (S215: Yes) when the printing request is a request for monochrome printing (S214: No). Color printing is executed (S218) if the usage authorization for the color printing function is given (S217: Yes) when the printing request is a request for color printing (S214: Yes). After that, the CPU 11 returns to S202, and processes similar to the above are repeated.

According to the second exemplary embodiment, by inhibiting execution of the correction process if no usage authorization for the color printing function is given when an execution request for a correction process is generated, it is possible to inhibit execution of the correction process having less necessity.

If the remaining available usage amount (available usage time) until the usage authorization turning from present to absent is the reference value or less, execution of the correction process is inhibited. Since the advantages are few even if the correction process is executed if the remaining available usage amount is small, execution of the correction process is inhibited.

In addition, when the usage authorization for the color printing function is changed from absent to present, the quality of subsequent images can be secured by carrying out the correction process. That is, after color printing restriction is cancelled, the color printing function is assumed to be utilized. Therefore, if a correction process is carried out by cancellation of the color printing restriction, it is not necessary to execute a correction process when accepting a printing request thereafter. Thus, the waiting time for a user who inputs a printing request can be reduced.

If the elapsed time and change in temperature from the last correction process are large, since the image quality is apt to be influenced. Therefore, a correction process is carried out in order to secure the image quality. Further, since it is considered that influence on image quality is comparatively small if the change amount in the elapsed time, etc., from the last correction process is small, it is possible to inhibit execution of the correction process having less necessity by not executing the correction process.

Third Exemplary Embodiment

Figure 6:
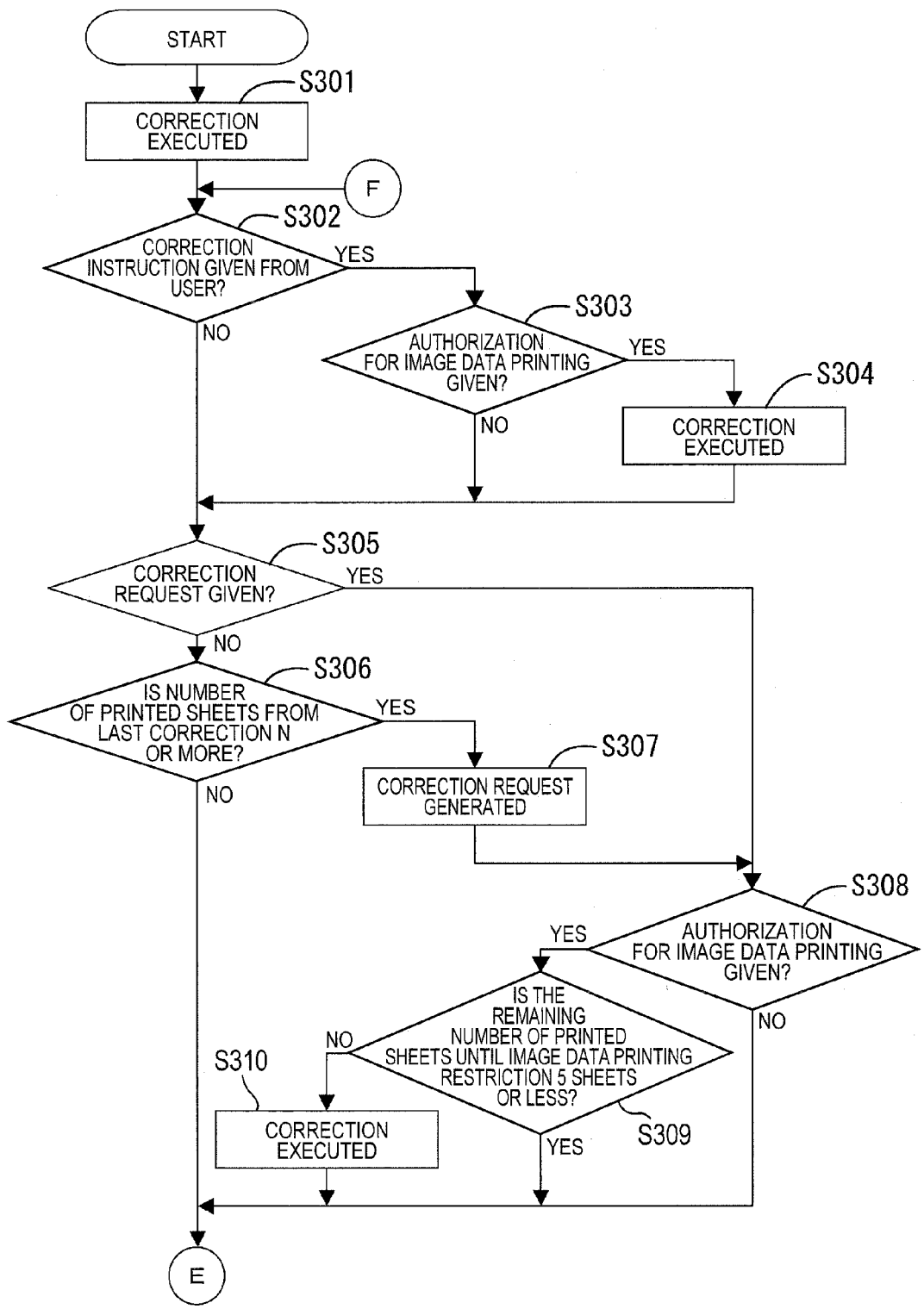
FIG. 6 is a flowchart showing flows of a printing correction control process according to a third exemplary embodiment of the invention.
Figure 7:
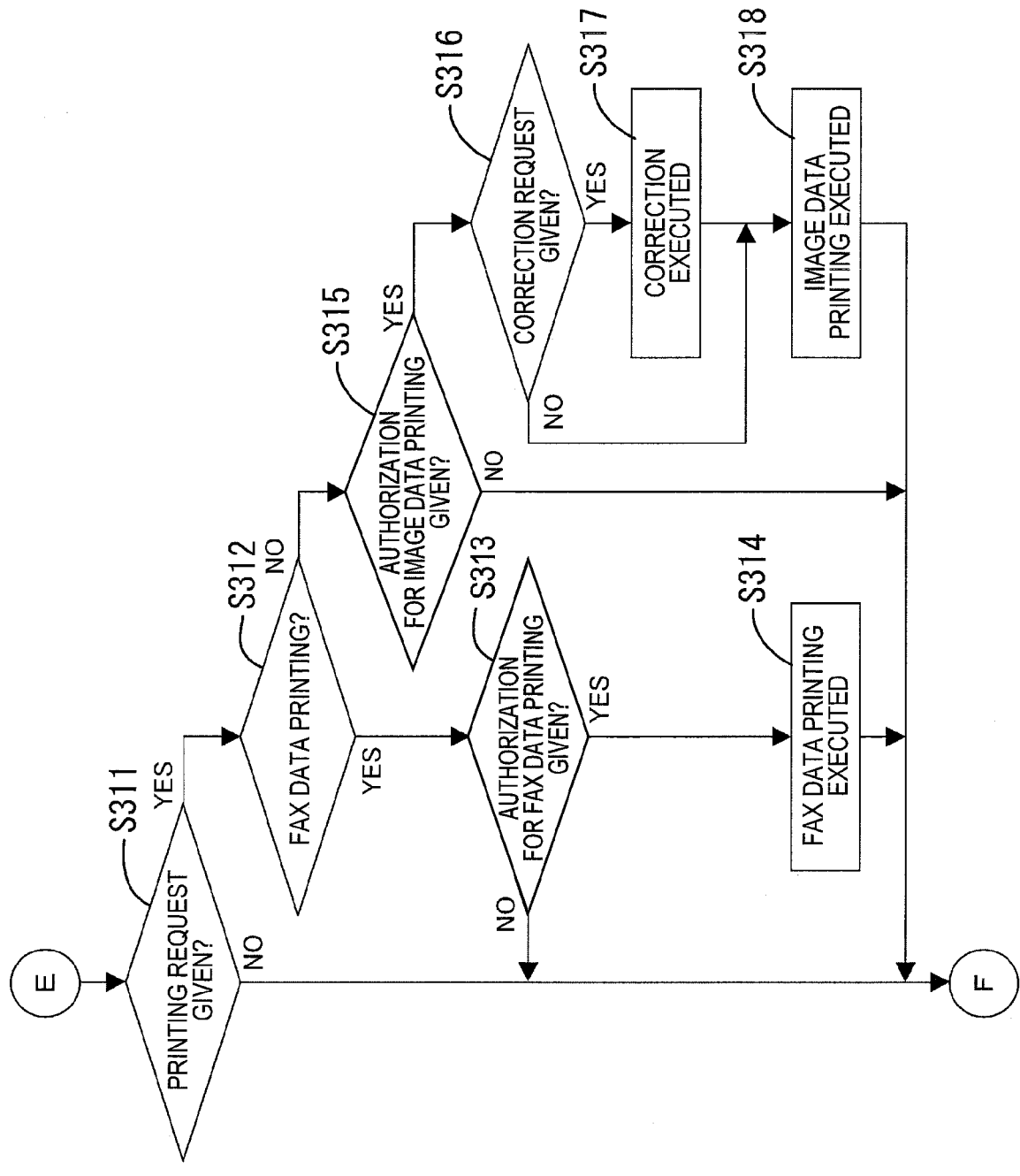
FIG. 7 is another flowchart showing flows of a printing correction control process continued from FIG. 6.

Referring to FIGS. 6 and 7, a third exemplary embodiment according to the invention will be described.

In the third exemplary embodiment, the usage restriction information shows that only one type of usage authorization is set (that is, single usage authorization common to all the users is set) for each of the facsimile data printing function for printing facsimile data received via the telephone line 40 and the image data printing function for printing image data acquired from means other than the facsimile. Incidentally, the image data printing function is, for example, a copying function by which image data acquired by reading a document by means of the scanner portion 19 is printed or a printing function by which image data received from a peripheral computer 30 is printed.

The CPU 11 first executes a correction process (S301) as shown in FIG. 6 when starting a printing correction control process after the power of the image forming apparatus 10 is turned on. Then, the CPU 11 determines whether a correction instruction is accepted from a user (S302). If the correction instruction is accepted (S302: Yes), it is determined whether usage authorization for the image data printing function is given (S303). If the usage authorization for the image data printing function is given (S303: Yes), a correction process is executed (S304). In addition, if no usage authorization for the image data printing function is given (S303: No), no correction process is executed. That is, if only the usage authorization for the facsimile data printing function is given, and no usage authorization for the other printing functions is given, no correction process is executed.

Next, the CPU 11 determines whether any correction request is given (S305). If no correction request is given (S305: No), it is determined whether the number of printed sheets from execution of the last correction process is the predetermined number of sheets N or more (S306). If the number of printed sheets is a predetermined number of sheets N or more (S306: Yes), a correction request is generated (S307). If the correction request is generated in S307, or if it is determined in S305 that the correction request is given (S305: Yes), it is then determined whether usage authorization for the image data printing function is given (S308).

If the usage authorization for image data printing is given (S308: Yes), it is further determined whether the remaining number of printed sheets until reaching the upper limit of the available number of printed sheets, that is, the remaining number of sheets (one example of the available usage amount) until the usage authorization for printing image data turns from present to absent is 5 sheets or less (S309). If the remaining number of printed sheets is more than 5 sheets (S309: No), a correction process is executed (S310). If no usage authorization for printing image data is given (S308: No), or if the number of printed sheets until the upper limit of the available number of sheets for image data printing is 5 sheets or less (S309: Yes), no correction process is executed. That is, here as well, if only the usage authorization for facsimile data printing function is given, and no usage authorization for the other printing functions is given, no correction process is executed.

Next, as shown in FIG. 7, the CPU 11 determines whether a printing request is accepted (S311). If a printing request is accepted (S311: Yes), if the printing request is a request for facsimile data printing (S312: Yes), it is determined whether usage authorization for the facsimile data printing is given (S313). If the authorization for the facsimile data printing is given (S313: Yes), facsimile data printing is executed (S314).

In addition, the CPU 11 determines whether the usage authorization for the image data printing function is given (S315) if the printing request is a request for image data printing (S312: No). If the usage authorization is given for the image data printing (S315: Yes), it is further determined whether a correction request is given (S316). If the correction request is given (S316: Yes), image data printing is executed (S318) after the correction process is executed (S317). If no correction request is given (S316: No), the image data printing is executed in S318 without executing any correction process. After that, the CPU 11 returns to S302, and repeats processes similar to the above.

According to the third exemplary embodiment, if the usage authorization is given for the facsimile data printing function, and no usage authorization is given for the image data printing function, execution of the correction process is inhibited. Generally, since the quality of images in printing facsimile data is comparatively lower than the quality of images in printing image data, it is thereby possible to inhibit execution of the correction process having less necessity.

Modification to Exemplary Embodiments

The invention is not limited to the above-described exemplary embodiments. For example, following modifications may be made within the technical scope of the invention.

In the above-described exemplary embodiments, the image forming apparatus 10 executes usage restriction of the printing function and the image quality adjusting process. Alternatively, in an image forming system including the image forming apparatus 10 and the computer 30 as shown in FIG. 1, the computer 30 may execute usage restriction of the printing function and the image quality adjusting process. For example, when a user causes the CPU 31 of the computer 30 to execute predetermined programs and inputs an instruction to transmit a printing request or a correction instruction from the operation portion 21, the CPU 31 looks into the usage authorization of the user with reference to the usage restriction information stored in the hard-disk drive 34, etc. If no usage authorization is given, it is configured that the printing request or the correction instruction is not transmitted through the network interface 37.

In the first exemplary embodiment, the correction process is inhibited in accordance with presence or absence of the usage authorization for the color printing function. Alternatively, it may be configured that two types of image quality adjusting processes are made executable, which are, for example, an image quality adjusting process (i.e., density correction using respective colors) corresponding to color printing, and an image quality adjusting process (i.e., density correction of only black color) corresponding to monochrome printing. In this case, if the usage authorization for the monochrome printing function is given while no usage authorization for the color printing function is given, execution of the image quality adjusting process corresponding to monochrome printing is not inhibited while execution of the image quality adjusting process corresponding to color printing is inhibited.

The conditions set for usage authorization with respect to various types of functions may be appropriately changed. For example, presence or absence of the usage authorization may be set in accordance with the total usage hours and the number of times of usage of a specified function.

The condition to generate an execution request (correction request) of the image quality adjusting process may be appropriately changed. For example, the process of S106 in FIG. 2 described above may be replaced for S205 in the same drawing, or the condition may be replaced for another condition based on change in temperature. The condition to determine presence or absence of usage authorization may be appropriately changed. In line therewith, the process (S208 in FIG. 4 and S309 in FIG. 6) to determine whether the remaining available usage amount until turning from present to absent is the reference value or less, may also be appropriately changed.

In the image forming apparatus, only one of the printing correction control processes in the above-described exemplary embodiments may be executable or multiple types of processes may be made executable. The image forming apparatus may be configured so as to select which process is to be executed.

The invention may be applicable to various types of image forming apparatuses such as an electrophotographic type image forming apparatus and an ink jet type image forming apparatus. For example, the invention may also be applicable to an image forming apparatus exclusively used for monochrome printing and those not equipped with a scanning function, a copying function, a facsimile function, etc.

According to another aspect of the invention, in the image forming apparatus, wherein the control unit inhibits the adjusting unit from executing the image quality adjusting process if the restriction unit restricts the usage of the image forming function.

Further, according to still another aspect of the invention, the image forming apparatus further comprises: an accepting unit that accepts an execution instruction of the image quality adjusting process from a user, wherein the usage authorization is set for each user, and wherein, when the accepting unit accepts the execution instruction of the image quality adjusting process from the user, the control unit is operable to: control the adjusting unit to execute the image quality adjusting process in accordance with the execution instruction from the user if the user has the usage authorization for the image forming function; and inhibit the adjusting unit from executing the image quality adjusting process if the user does not have the usage authorization for the image forming function.

According thereto, by inhibiting execution of the image quality adjusting process with respect to an execution instruction of an image quality adjusting process from a user not having usage authorization for the image forming function, it is possible to inhibit execution of the image quality adjusting process having less necessity.

According to still another aspect of the invention, the image forming apparatus further comprises: a generating unit that generates an execution request of the image quality adjusting process if predetermined condition is satisfied, wherein, when the generating unit generates the execution request of the image quality adjusting process, the control unit is operable to: control the adjusting unit to execute the image quality adjusting process if the usage authorization for the image forming function; and inhibit the adjusting unit from executing the image quality adjusting process if the usage authorization for the image forming function is not given.

According thereto, if no usage authorization for an image forming function is given when an execution request of an image quality adjusting process is generated, it is possible to inhibit execution of the image quality adjusting process having less necessity by inhibiting execution of the image quality adjusting process.

According to still another aspect of the invention, the image forming apparatus further comprises: a generating unit that generates an execution request of the image quality adjusting process if predetermined condition is satisfied, wherein, when the generating unit generates the execution request of the image quality adjusting process, the controlling unit is operable to: control the adjusting unit to execute the image quality adjusting process if there exists a user having the usage authorization for the image forming function; and inhibit the adjusting unit from executing the image quality adjusting process if there does not exist any user having the usage authorization for the image forming function.

According thereto, if there does not exist any user having usage authorization for an image forming function when an execution request of the image quality adjusting process is generated, it is possible to inhibit execution of the image quality adjusting process having less necessity by inhibiting execution of the image quality adjusting process.

According to still another aspect of the invention, the image forming apparatus further comprises: a facsimile receiving unit that receives facsimile data; and an acquiring unit that acquires image data, wherein the forming unit comprises: a facsimile data printing function for forming the image based on the facsimile data received by the facsimile receiving unit; and an image data printing function for forming the image based on the image data acquired by the acquiring unit, wherein the usage authorization for the image forming function is set for each function of the facsimile data printing function and the image data printing function, and wherein the control unit is operable to inhibit the adjusting unit from executing the image quality adjusting process if usage authorization for the facsimile data printing function is given and usage authorization for the image data printing function is not given.

According thereto, if usage authorization for a facsimile data printing function is given and no usage authorization for an image data printing function is given, execution of the image quality adjusting process is inhibited. Generally, since the quality of an image in printing facsimile data is comparatively lower than the quality of the image in printing image data, it is thereby possible to inhibit execution of the image quality adjusting process having less necessity.

According to still another aspect of the invention, in the image forming apparatus, wherein the restricting unit determines the presence or absence of the usage authorization for the image forming function based on whether or not at least one of usage amount and usage time of the image forming function satisfies predetermined condition.

According thereto, presence or absence of the usage authorization is determined based on whether or not the usage amount (i.e., number of printed sheets, number of times of usage and usage time) of the image forming function and the usage time satisfy predetermined conditions. Therefore, it becomes easy to manage the usage authorization, and the convenience is high.

According to still another aspect of the invention, in the image forming apparatus, wherein the control unit inhibits the adjusting unit from executing the image quality adjusting process if remaining available usage amount for the image forming function until the usage authorization for the image forming function turns from present to absent is reference value or less.

According thereto, execution of the image quality adjusting process is inhibited if the remaining available usage amount (i.e., remaining number of printable sheets and available usage time) until the usage authorization turns from present to absent is the reference value or less. Since the advantages are few even if the image quality adjusting process is executed when the remaining available usage amount is small, execution of the image quality adjusting process is inhibited.

According to still another aspect of the invention, in the image forming apparatus, wherein the control unit controls the adjusting unit to execute the image quality adjusting process if the usage authorization for the image forming function changes from the absent to present.

According thereto, if the usage authorization changes from absent to present, it is possible to secure the quality of the image formed thereafter by carrying out the image quality adjusting process.

According to still another aspect of the invention, in the image forming apparatus, wherein the control unit compares a change amount of at least one of usage amount, elapsed time and change in temperature from the last image quality adjusting process with predetermined value if the usage authorization for the image forming function changes from the absent to present, wherein, if the change amount is the predetermined value or more, the control unit controls the adjusting unit to execute the image quality adjusting process, and wherein, if the change amount is less than the predetermined value, the control unit inhibits the adjusting unit from executing the image quality adjusting process.

According thereto, since the image quality is apt to be influenced if the usage amount, elapsed time and change in temperature from the last image quality adjusting process is large, the image quality is secured by carrying out the image quality adjusting process. In addition, since influence on image quality is considered to be comparatively small if the change amount in the usage amount, etc., from the last image quality adjusting process is small, it is possible to inhibit execution of the image quality adjusting process having less necessity by not causing the image quality adjusting process to be executed.

According to still another aspect of the invention, in the image forming apparatus, wherein the image forming function of the forming unit comprises a color printing function using multiple colors of colorants and a monochrome printing function using a single colorant, wherein the image quality adjusting process of the adjusting unit comprises: measuring patterns formed by the forming unit using multiple colors of colorants; and adjusting the image based on the measuring results, wherein the usage authorization for the image forming function is set for each of the color printing function and the monochrome printing function, and wherein the control unit is operable to: control the adjusting unit to execute the image quality adjusting process if the usage authorization for the color printing function is not given; and inhibit the adjusting unit from executing the image quality adjusting process if the usage authorization for the color printing function is given.

According thereto, if the color printing function cannot be utilized, it is possible to inhibit execution of the image quality adjusting process having less necessity by inhibiting execution of the image quality adjusting process.

What is claimed is:

1. An image forming apparatus comprising:
   a forming apparatus configured to perform an image forming function for forming an image;
   a processor, and
   a memory storing computer readable instructions that, when executed by the processor, cause the image forming apparatus to:
   restrict usage of the image forming function based on presence or absence of usage authorization for a color printing function of the image forming function of the forming apparatus;
   execute an image quality adjusting process to improve a quality of the formed image, the image quality adjusting process comprising measuring at least one of deviation in respective colors of image formed positions and deviation in density of the respective formed colors, and correcting the deviations;
   inhibit the executing of the image quality adjusting process in response to a determination of the presence or absence of the usage authorization for the color printing function the image forming function, the presence of the usage authorization for the color printing function the image forming function inhibiting the executing; and
   generate an execution request of the image quality adjusting process when a predetermined condition is satisfied,
   wherein, when generating the execution request of the image quality adjusting process,
     execute the image quality adjusting process when a user having the usage authorization for the image forming function exists; and
     inhibit executing the image quality adjusting process when no user having the usage authorization for the color printing function of the image forming function exists, even if the execution request exists.

2. The image forming apparatus according to claim 1, further comprising:
   an accepting apparatus configured to accepts an execution instruction of the image quality adjusting process from a user,
   wherein the usage authorization for the color printing function of the image forming function is set for each user, and
   wherein, when the accepting apparatus accepts the execution instruction of the image quality adjusting process from the user, the processor is configured to:
     execute the image quality adjusting process in accordance with the execution instruction from the user if the user has the usage authorization for the color printing function of the image forming function; and
     inhibit the executing of the image quality adjusting process if the user does not have the usage authorization for the color printing function of the image forming function.

3. The image forming apparatus according to claim 1, wherein the processor is configured to:
   generate an execution request of the image quality adjusting process if a predetermined condition is satisfied,
   wherein, when generating the execution request of the image quality adjusting process,
     execute the image quality adjusting process if the usage authorization for the color printing function of the image forming function is given; and
     inhibit executing the image quality adjusting process if the usage authorization for the color printing function of the image forming function is not given.

4. The image forming apparatus according to claim 1, determining of the presence or absence of the usage authorization for the color printing function of the image forming function is based on whether or not at least one of usage amount and usage time of the image forming function satisfies predetermined condition.

5. The image forming apparatus according to claim 4, wherein the executing of the image quality adjusting process is inhibited if remaining available usage amount for the image forming function is a reference value or less.

6. The image forming apparatus according to claim 1, wherein the image quality adjusting process is executed if the usage authorization for the color printing function of the image forming function changes from the absent to present.

7. The image forming apparatus according to claim 1,
wherein the processor is further configured to compare a change amount of at least one of usage amount, elapsed time and change in temperature from the last image quality adjusting process with a predetermined value if the usage authorization for the color printing function of the image forming function changes from the absent to present,
wherein, if the change amount is the predetermined value or more, executing the image quality adjusting process, and
wherein, if the change amount is less than the predetermined value, inhibiting the executing of the image quality adjusting process.

8. The image forming apparatus according to claim 1,
wherein the image forming function of the forming apparatus comprises the color printing function using multiple colors of colorants and a monochrome printing function using a single colorant,
wherein the image quality adjusting process comprises:
   measuring patterns formed by the forming apparatus using multiple colors of colorants; and
   adjusting the image based on the measuring results,
wherein the processor is further configured to:
   execute the image quality adjusting process if the usage authorization for the color printing function is given; and
   inhibit the executing of the image quality adjusting process if the usage authorization for the color printing function is not given.

9. An image forming system comprising:
an image forming apparatus; and
a higher-level device configured to communicates with the image forming apparatus,
wherein the image forming apparatus comprises:
   a forming apparatus configured to form an image; and
   an adjusting apparatus configured to execute an image quality adjusting process to improve a quality of the image formed by the forming apparatus,
wherein the higher-level device comprises:
   an instructing apparatus configured to instructs the image forming apparatus to form the image, and
wherein one of the image forming apparatus and the higher-level device further comprises a processor and a memory storing computer readable instructions that, when executed by the processor, cause the one of the image forming apparatus and the higher-level device to:
   restrict usage of the image forming function based on presence or absence of usage authorization for the color printing function of the image forming function of the forming apparatus;
   inhibit the executing of the image quality adjusting process in response to a determination of the presence or absence of the usage authorization for the color printing function of the the image forming function, the presence of the usage authorization for the color printing function of the the image forming function inhibiting the executing; and
   generating an execution request of the image quality adjusting process when a predetermined condition is satisfied,
wherein, when generating the execution request of the image quality adjusting process,
   execute the image quality adjusting process when a user having the usage authorization for the color printing function of the image forming function exists; and
   inhibit executing the image quality adjusting process when no user having the usage authorization for the color printing function of the image forming function exists, even if the execution request exists.

10. An image forming apparatus comprising:
a forming apparatus configured to perform an image forming function for forming an image;
a processor; and
a memory storing computer readable instructions that, when executed by the processor, cause the image forming apparatus to:
   restrict usage of the image forming function based on presence or absence of usage authorization for the image forming function of the forming apparatus;
   execute an image quality adjusting process to improve a quality of the formed image, the image quality adjusting process comprising measuring at least one of deviation in respective colors of image formed positions and deviation in density of the respective formed colors, and correcting the deviations; and
   inhibit the executing of the image quality adjusting process in response to a determination of the presence or absence of the usage authorization of the image forming function, the presence of the usage authorization for the image forming function inhibiting the executing;
a facsimile receiving apparatus that receives facsimile data; and
an acquiring apparatus that acquires image data,
wherein the forming apparatus comprises:
   a facsimile data printing function for forming the image based on the facsimile data received by the facsimile receiving apparatus; and
   an image data printing function for forming the image based on the image data acquired by the acquiring apparatus,
wherein the usage authorization for the image forming function is set for each function of the facsimile data printing function and the image data printing function, and
wherein the processor is configured to inhibit executing the image quality adjusting process if usage authorization for the facsimile data printing function is given and usage authorization for the image data printing function is not given.

* * * * *

UNITED STATES PATENT AND TRADEMARK OFFICE
CERTIFICATE OF CORRECTION

| | | |
|---|---|---|
| PATENT NO. | : 8,537,380 B2 | Page 1 of 1 |
| APPLICATION NO. | : 12/608530 | |
| DATED | : September 17, 2013 | |
| INVENTOR(S) | : Akihiro Yamada | |

It is certified that error appears in the above-identified patent and that said Letters Patent is hereby corrected as shown below:

On the Title Page, Item (54) and in the Specifications, at Column 1, lines 1 and 2, Title Should Read:

-- IMAGE FORMING APPARATUS PERFORMING INHIBITION OF EXECUTION OF AN
      IMAGE QUALITY ADJUSTING PROCESS --

Signed and Sealed this
First Day of April, 2014

Michelle K. Lee
*Deputy Director of the United States Patent and Trademark Office*